(12) United States Patent
Jeong et al.

(10) Patent No.: US 11,588,159 B2
(45) Date of Patent: Feb. 21, 2023

(54) CONTROL SYSTEM AND METHOD FOR PREVENTING OVERHEATING OF A FUEL CELL

(71) Applicants: HYUNDAI MOTOR COMPANY, Seoul (KR); KIA CORPORATION, Seoul (KR)

(72) Inventors: Seong Cheol Jeong, Suwon-si (KR); Jae Won Jung, Suwon-si (KR); Jong Gyun Kim, Yongin-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 0 days.

(21) Appl. No.: 17/463,184

(22) Filed: Aug. 31, 2021

(65) Prior Publication Data

US 2022/0190361 A1    Jun. 16, 2022

(30) Foreign Application Priority Data

Dec. 14, 2020 (KR) .......................... 10-2020-0174586

(51) Int. Cl.
*H01M 8/04* (2016.01)
*H01M 8/04029* (2016.01)
*H01M 8/04858* (2016.01)

(52) U.S. Cl.
CPC ... *H01M 8/04029* (2013.01); *H01M 8/04932* (2013.01); *H01M 2250/20* (2013.01)

(58) Field of Classification Search
CPC .................. H01M 8/04029; H01M 8/04932
See application file for complete search history.

(56) References Cited

U.S. PATENT DOCUMENTS

| 9,865,888 | B2 | 1/2018 | Kwon |
| 2007/0166577 | A1* | 7/2007 | Inai .................. H01M 8/04268 429/513 |
| 2016/0126565 | A1 | 5/2016 | Kwon |

FOREIGN PATENT DOCUMENTS

KR       101628514 B1     6/2016

* cited by examiner

Primary Examiner — Olatunji A Godo
(74) Attorney, Agent, or Firm — Lempia Summerfield Katz LLC

(57) ABSTRACT

A control system and method for preventing a fuel cell from overheating are disclosed. The system includes: a fuel cell that generates electric power through reaction of fuel gas and oxidation gas; a cooling line in which a cooling medium flows and performs heat exchange with the fuel cell; a cooling pump installed on the cooling line and configured to circulate the cooling medium through the cooling line; a cooling controller that controls an operating state of the cooling pump on the basis of the temperature of the fuel cell or the cooling medium; and a power generation controller that limits power generation of the fuel cell on the basis of the operating state of the cooling pump.

13 Claims, 6 Drawing Sheets

CONTROL SYSTEM AND METHOD FOR PREVENTING OVERHEATING OF A FUEL CELL

CROSS REFERENCE TO RELATED APPLICATION

The present application claims priority to Korean Patent Application No. 10-2020-0174586, filed Dec. 14, 2020, the entire contents of which are incorporated herein for all purposes by this reference.

BACKGROUND

1. Field of the Disclosure

The present disclosure relates to a control system and method for preventing a fuel cell from overheating. More specifically, the present disclosure relates to a technology for preventing a fuel cell from overheating by adaptively limiting the power generation of a fuel cell on the basis of an operating state of a cooling pump that circulates coolant.

2. Description of the Related Art

A fuel cell is a kind of generator that directly converts chemical energy resulting from oxidation of fuel into electric energy. A fuel cell is fundamentally the same as a chemical cell in that it uses oxidation and reduction reactions. However, while a chemical cell is a closed reaction system, a fuel cell is an open reaction system in which reactants are continuously supplied to the system and reaction products are continuously removed from the system. In recent years, fuel cells have been put into practical use. Also, research for use of such a fuel cell as an energy source for eco-friendly vehicles has been actively conducted because the reaction product of a fuel cell is pure water.

A fuel cell includes a fuel cell stack that generates electrical energy through chemical reactions, an air supply device that supplies air to the air electrode (cathode electrode) of the fuel cell stack, and a hydrogen supply device that supplies hydrogen to the hydrogen electrode (anode) of the fuel cell stack. In other words, air containing oxygen is supplied to the air electrode (cathode) of the fuel cell stack and hydrogen is supplied to the hydrogen electrode (anode) of the fuel cell stack.

The fuel cell stack is physically inferior to a conventional internal combustion engine in terms of thermal damage. Due to the thermal damage, a fail-safe strategy which is a control method to diagnose and cope with overheating of a fuel cell stack emerges as a very important issue.

In general, control for cooling a fuel cell is performed on the basis of the temperature of coolant flowing out through an outlet of the fuel cell stack because it is difficult to directly sense the internal temperature of the fuel cell stack. Accordingly, when a temperature sensor that senses the temperature of the coolant at the outlet of the fuel cell stack malfunctions, there is a problem that it is impossible to cope with overheating of the fuel cell stack.

The foregoing is intended merely to aid in understanding the background of the present disclosure. The foregoing is not intended to mean that the present disclosure falls within the purview of the related art that is already known to those having ordinary skill in the art.

SUMMARY

The present disclosure has been made to solve the problem occurring in the related art. An objective of the present disclosure is to provide a technology for preventing a fuel cell from overheating by limiting power generation of the fuel cell on the basis of an operating state of a cooling pump that circulates coolant to cool the fuel cell.

According to one aspect of the present disclosure, a control system is provided for preventing a fuel cell from overheating, the system including: a fuel cell that generates electric power through a reaction between a fuel gas and an oxidation gas; a cooling line connected to the fuel cell so that a cooling medium flowing through the cooling line performs heat exchange with the fuel cell; a cooling pump installed on the cooling line and configured to circulate the cooling medium through the cooling line when the cooling pump is driven; a cooling controller that controls an operating state of the cooling pump on the basis of a temperature of the fuel cell or the cooling medium; and a power generation controller that limits an amount of electric power generated by the fuel cell on the basis of the operating state of the cooling pump.

The cooling line may be provided with a radiator in which the cooling medium performs heat exchange with external air. The cooling line may be connected such that the radiator communicates with an outlet and an inlet of the fuel cell. The cooling pump may pump the cooling medium such that the cooling medium discharged from the outlet of the fuel cell partially or entirely flows to the radiator or such that the cooling medium discharged from the radiator flows to the inlet of the fuel cell.

The system may further include a temperature sensor installed on the cooling line and positioned near the outlet of the fuel cell. The temperature sensor may be configured to sense the temperature of the cooling medium. The cooling controller may control the operating state of the cooling pump on the basis of the temperature of the cooling medium.

The cooling controller may control the cooling pump such that an actual rotation speed of the cooling pump follows a reference rotation speed that is set on the basis the temperature of the fuel cell or the temperature of the cooling medium. The power generation controller may adaptively limit the amount of electric power generated by the fuel cell on the basis of a speed difference between the actual rotation speed of the cooling pump and the reference rotation speed.

The power generation controller may limit the amount of electric power generated by the fuel cell to be equal to or less than a reference power generation amount that is preset according to the temperature of the fuel cell or the cooling medium. The power generation controller may also apply a first offset value that is set on the basis of the speed difference to the temperature of the fuel cell or the cooling medium or to the reference power generation amount.

When the speed difference is equal to or greater than a preset speed difference value, the power generation controller may set the first offset value such that the temperature of the fuel cell or the cooling medium is gradually reduced or the reference power generation amount is gradually reduced as the speed difference is increased.

The power generation controller may limit the amount of electric power generated by the fuel cell on the basis of a power consumption difference between a reference power consumption amount that is preset according to the rotation speed of the cooling pump and an actual power consumption amount of the cooling pump.

The power generation controller adaptively limits the amount of electric power generated by the fuel cell on the basis of the power consumption difference only when the actual rotation speed of the cooling pump is equal to or higher than the preset reference rotation speed.

The power generation controller may limit the amount of electric power generated by the fuel cell to be equal to or less than a reference power generation amount according to the temperature of the fuel cell or the cooling medium. When the actual power consumption amount of the cooling pump is equal to or less than the reference power consumption amount that is preset, the power generation controller applies a second offset value that is set on the basis of the power consumption difference to the temperature of the fuel cell or the cooling medium or to the reference power generation amount.

When the power consumption difference is equal to or greater than a preset power consumption difference, the power generation controller may set the second offset value such that the temperature of the fuel cell or the cooling medium is gradually reduced or the reference power generation amount is gradually reduced as the power consumption difference is increased.

The cooling controller may increase an amount of cooling the cooling pump on the basis of the power consumption difference when the actual power consumption of the cooling pump is greater than the reference power consumption difference.

According to another aspect of the present disclosure, there is provided a control method of preventing a fuel cell from overheating, the method including: estimating a temperature of a fuel cell or sensing a temperature of a cooling medium; controlling an operating state of a cooling pump that circulates a cooling medium through a cooling line connected to the fuel cell on the basis of the estimated temperature of the fuel cell or the sensed temperature of the cooling medium; and adaptively limiting an amount of electric power generated by the fuel cell according to the operating state of the cooling pump.

In the controlling of the operating state, the cooling pump may be controlled such that an actual rotation speed thereof follows a reference rotation speed that is set on the basis of the temperature of the fuel cell or the cooling medium. The method further includes calculating a speed difference between the actual rotation speed of the cooling pump and the reference rotation speed, in which the calculating is performed prior to the limiting of the amount of electric power. In the limiting of the amount of electric power, the amount of electric power generated by the fuel cell is limited on the basis of the calculated speed difference.

In the limiting of the amount of electric power, the amount of power generated by the fuel cell is limited to be equal to or less than a reference power generation amount that is set according to the temperature of the fuel cell or the cooling medium. In addition, a first offset value that is set on the basis of the speed difference is applied to the temperature of the fuel cell or the cooling medium or to the reference power generation amount.

The method may further include calculating a power consumption difference that is a difference between an actual power consumption amount of the cooling pump and a reference power consumption amount that is preset according to the rotation speed of the cooling pump, in which the calculating is performed prior to the limiting of the amount of electric power. In the limiting, the amount of electric power generated by the fuel cell may be limited on the basis of the calculated power consumption difference.

In the limiting, the amount of electric power generated by the fuel cell is limited to be equal to or less than a reference power generation amount that is preset according to the temperature of the fuel cell or the cooling medium. When the actual power consumption of the cooling pump is less than the reference power consumption, a second offset value that is set on the basis of the power consumption difference is applied to the temperature of the fuel cell or the cooling medium or to the reference power generation amount.

The method may further include increasing an amount of cooling the cooling pump on the basis of the power consumption difference when the actual power consumption of the cooling pump is greater than the reference power consumption. The increasing of the cooling amount may be performed after the calculating of the power consumption difference.

The control system and method according to the present disclosure can prevent a fuel cell from overheating even through there is a difference between the temperature of a fuel cell and the temperature of a cooling medium by performing adaptive control depending on an operating state of a cooling pump.

BRIEF DESCRIPTION OF THE DRAWINGS

The above and other objects, features, and other advantages of the present disclosure should be more clearly understood from the following detailed description taken in conjunction with the accompanying drawings, in which.

DESCRIPTION OF EMBODIMENTS

Figure 1:
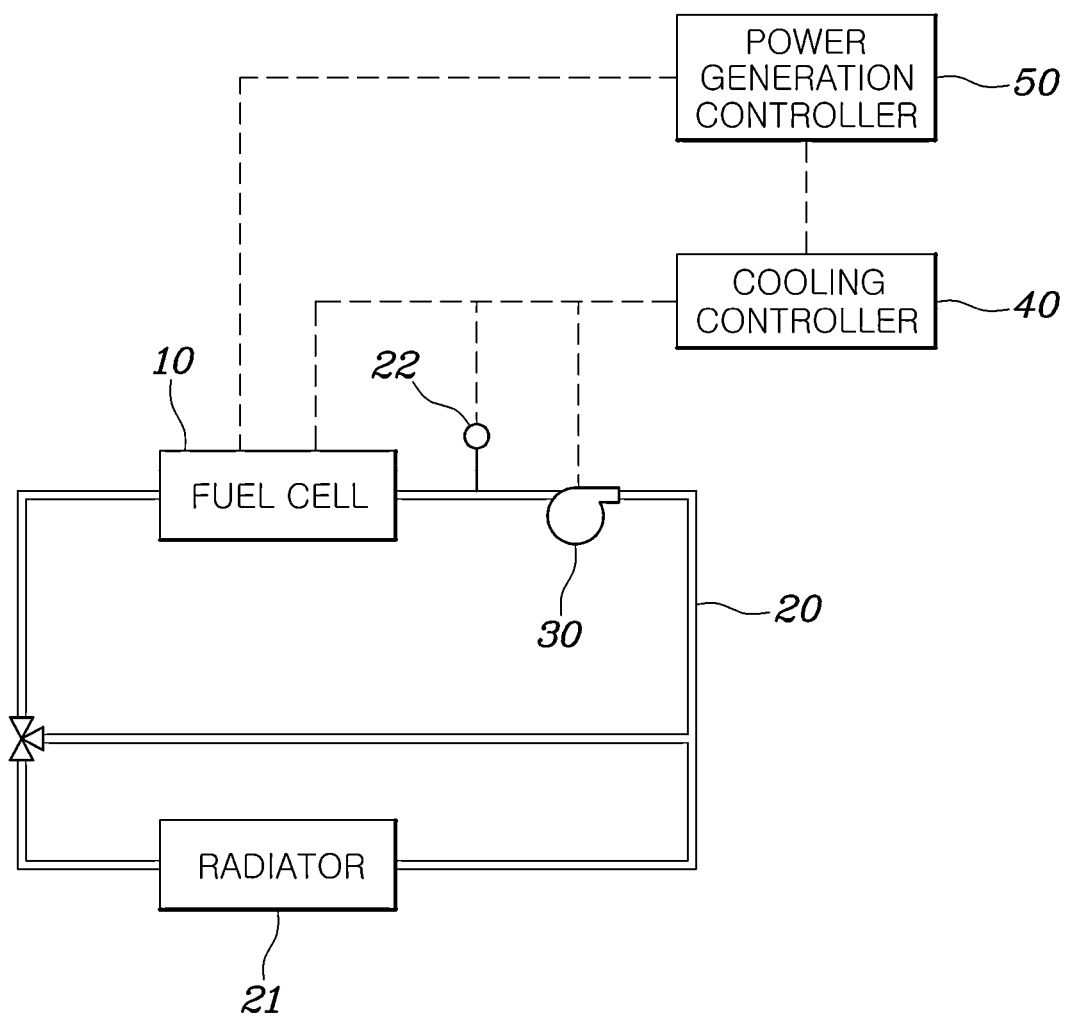
FIG. 1 is a schematic diagram illustrating the construction of an overheating control system for a fuel cell, according to one embodiment of the present disclosure.

Reference now should be made to the drawings, in which the same reference numerals are used throughout the different drawings to designate the same or similar components.

Specific structural or functional descriptions of embodiments of the present disclosure disclosed in the specification of the present application are provided only for illustrative purposes. The present disclosure can be embodied in various forms and it should not be construed that embodiments of the present disclosure are limited only to the embodiments described in the specification of the present application.

There can be various embodiments in accordance with the concept of the present disclosure and only some embodiments are illustrated in the drawings and described in detail in the description below. While specific embodiments of the present disclosure are described herein below, they are only for illustrative purposes and should not be construed as limiting to the present disclosure. Thus, the present disclosure should be construed to cover not only the specific embodiments but also cover all modifications, equivalents, and substitutions that fall within the concept and technical spirit of the present disclosure.

Terms used in the specification, "first", "second", etc. can be used to discriminate one element from another element, but the order or priority of the elements are not limited by the terms unless specifically stated. Accordingly, a first element in an embodiment may be referred to as a second element in another embodiment. Similarly, a second element in an embodiment may be referred to as a first element in another embodiment, only for the purpose of discrimination of one element from another element, without departing from the scope of the present disclosure as claimed.

It should be understood that when any element is referred to as being "connected" or "coupled" to another element, one element may be directly connected or coupled to the other element, or an intervening element may be present therebetween. In contrast, it should be understood that when an element is referred to as being "directly coupled" or "directly connected" to another element, there are no intervening elements present between them. Other expressions describing relationships between elements, for example, "between", "directly between" "adjacent to", "directly adjacent" should be interpreted in the same manner.

The terminology used herein is for the purpose of describing particular embodiments only and is not intended to be limiting. As used herein, the singular forms "a", "an", and "the" are intended to include the plural forms as well unless the context clearly indicates otherwise. It should be further understood that the terms "comprises", "includes", or "has" when used in the present disclosure specify the presence of stated features, regions, integers, steps, operations, elements and/or components, but do not preclude the presence or addition of one or more other features, regions, integers, steps, operations, elements, components and/or combinations thereof.

In addition, unless otherwise defined, all terms including technical and scientific terms used herein have the same meaning as commonly understood by those who have ordinary skill in the art to which the present disclosure belongs. It should be further understood that terms, such as those defined in commonly used dictionaries, should be interpreted as having a meaning that is consistent with their meaning in the context of the relevant art and the present disclosure. These terms should not be interpreted in an idealized or overly formal sense unless expressly so defined herein.

Hereinafter, specific embodiments of the present disclosure are described in detail with reference to the accompanying drawings. Through the drawings, like reference symbols denote like elements.

FIG. 1 is a schematic diagram illustrating the construction of an overheating control system for a fuel cell 10, according to one embodiment of the present disclosure.

Referring to FIG. 1, the overheating control system for the fuel cell 10, according to one embodiment of the present disclosure, includes: the fuel cell 10 for generating electric power through a reaction of a fuel gas and an oxidation gas; a cooling line 20 connected to the fuel cell 10 and configured to be filled with a cooling medium that performs heat exchanges with the fuel cell 10; a cooling pump 30 installed on the cooling line 20 and configured to circulate the cooling medium through the cooling line 20 when the cooling pump 30 is driven; a cooling controller 40 for controlling an operating state of the cooling pump 30 on the basis of the temperature of the fuel cell 10 or the temperature of the cooling medium; and a power generation controller 50 that limits an amount of electric power generated by the fuel cell 10 on the basis of the operating state of the cooling pump 30.

The cooling controller 40 and the power generation controller 50 included in one embodiment of the present disclosure may be implemented using: a non-volatile memory (not shown) configured to store data associated with an algorithm configured to control operations of various components of a vehicle or with software instructions to execute the algorithm; and a processor (not shown) configured to perform operations described below using the data stored in the non-volatile memory. The memory and processor are implemented with discrete chips, respectively. Alternatively, the memory and processor may be implemented with an integrated chip. In another alternative, the processor may be implemented with an array of processors.

The fuel cell 10 is supplied with a fuel gas and an oxidation gas. Specifically, the anode and the cathode of the fuel cell 10 are supplied with the fuel gas and the oxidation gas, respectively. For example, the fuel gas is hydrogen and the oxidation gas is air containing oxygen. The fuel cell 10 generates electrical energy and thermal energy through a chemical reaction of hydrogen and oxygen.

The cooling line 20 is a pipeline through which a cooling medium flows and the cooling medium is, for example, water. In other words, a liquid cooling type is used. The cooling medium circulates by flowing through the cooling line 20, then flowing into the inlet of the fuel cell 10, flowing through the fuel cell 10, and flowing out of the outlet of the fuel cell 10.

The cooling pump 30 is installed on the cooling line 20 to allow the cooling medium to flow through the cooling line 20 when the pump 30 is driven. The cooling controller 40 controls the rotation speed of the cooling pump 30, thereby adjusting the flow rate of the cooling medium.

The cooling controller 40 controls the driving of the cooling pump 30 on the basis of the temperature of the cooling medium or the fuel cell 10. In one embodiment, the cooling controller 40 controls the cooling pump 30 such that the flow rate of the cooling medium increases with an increase in the temperature of the cooling medium or the fuel cell 10.

The cooling controller 40 controls a control valve to adjust the flow rate of the cooling medium passing through a radiator 21 to be described later.

The power generation controller 50 controls the power generation of the fuel cell 10. Specifically, the power generation controller 50 limits the amount of electric power generated by the fuel cell 10 on the basis of the operating state of the cooling pump 30. More specifically, the power generation controller 50 limits the output current or output voltage of the fuel cell 10.

More specifically, the power generation controller 50 limits the output current or output voltage of the fuel cell 10 on the basis of the temperature of the fuel cell 10 or the cooling medium. In an embodiment, the output current of the fuel cell 10 may be limited to be equal to or less than a reference current limit that is set to vary depending on the temperature of the fuel cell 10 or the cooling medium.

In particular, the power generation controller 50 changes the reference current limit of the fuel cell 10 according to the operating state of the cooling pump 30.

Therefore, there is an effect of preventing the fuel cell from overheating even through there is a difference between the temperature of the fuel cell 10 and the temperature of the cooling medium because the operating state of the cooling pump 30 is considered when limiting the power generation of the fuel cell.

The cooling line 20 is provided with a radiator 21 in which the cooling medium performs heat exchange with external air. The cooling line 20 is installed such that each of the inlet and outlet of the fuel cell 10 communicates with the radiator 21. The pump 30 causes the cooling medium discharged from the outlet of the fuel cell 10 to partially or entirely flow to the radiator 21, or causes the flow of the cooling medium discharged from the radiator to flow into the inlet of the fuel cell 10.

The radiator 21 is, for example, a device that makes the cooling medium flowing through the cooling line 20 perform heat exchange with external air.

The control system according to one embodiment of the present disclosure further includes a temperature sensor 22 that is installed on the cooling line 20 and positioned near the outlet of the fuel cell 10. The temperature sensor 22 measures the temperature of the cooling medium flowing through the cooling line 20. The cooling controller 40 controls the operating state of the cooling pump 30 on the basis of the temperature of the cooling medium.

The temperature of the cooling medium locally varies along the cooling line 20 and the temperature sensor 22 senses the temperature of the cooling medium discharged from the outlet of the fuel cell 10.

In addition, in the present disclosure, the temperature of the fuel cell 10 is estimated on the basis of the temperature of the cooling medium. Specifically, the temperature of the fuel cell 10 is estimated on the basis of the temperature of the cooling medium, which is measured at a position near the outlet of the fuel cell 10 by the temperature sensor 22.

In one embodiment, the cooling controller 40 controls the cooling pump 30 such that the actual rotation speed of the cooling pump 30 increases with an increase in the detected temperature of the cooling medium or the estimated temperature of the fuel cell 10.

Figure 2:
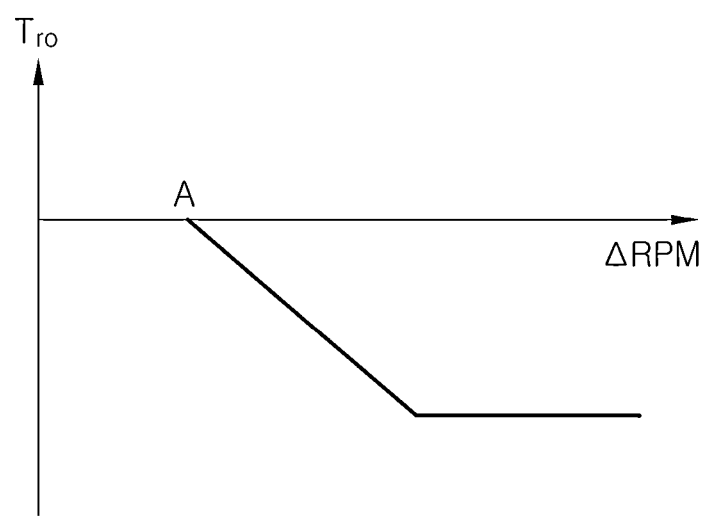
FIG. 2 is a graph illustrating a relationship between a speed difference and a first offset value, according to one embodiment of the present disclosure.

FIG. 2 is a graph illustrating a relationship between a speed difference and a first offset value, in one embodiment of the present disclosure.

Referring to FIG. 2, the cooling controller 40 controls the cooling pump 30 such that the actual rotation speed of the cooling pump 30 follows a reference rotation speed that is set on the basis of the temperature of the fuel cell 10 or the cooling medium. The power generation controller 50 controls the power generation (i.e., amount of electric power) of the fuel cell 10 on the basis of the difference between a preset reference rotation speed and the actual rotation speed of the cooling pump 30.

In one embodiment, the reference rotation speeds are mapped to the temperatures of the fuel cell 10, respectively or to the temperatures of the cooling medium, respectively.

The power generation controller 50 calculates a speed difference between the reference rotation speed (reference RPM) of the cooling pump 30 and the actual rotational speed (actual RPM) of the cooling pump 30 according to the following equation.

$$\Delta RPM = |\text{reference RPM} - \text{actual RPM}|$$

In another embodiment, the speed difference may be calculated by the equation "reference RPM command− actual RPM" which does not produce an absolute value. This is limitedly used only in a case where the actual RPM does not follow the reference RPM so that the cooling of the fuel cell 10 is not guaranteed.

The power generation controller 50 limits the power generation of the fuel cell 10 on the basis of the calculated speed difference. Specifically, the power generation controller 50 sets a first offset value that is to be applied to a reference power generation amount to which the generated power of the fuel cell 10 is limited according to the calculated speed difference.

The power generation controller 50 limits the power generation amount of the fuel cell 10 such that an amount of electric power generated by the fuel cell 10 is equal to or less than a reference power generation amount that is preset according to the temperature of the fuel cell or the cooling medium. In addition, the power generation controller applies a first offset value that is set on the basis of the speed difference to the temperature of the fuel cell or the cooling medium or to the reference power generation amount.

When the speed difference is equal to or greater than a preset speed difference, the power generation controller sets the first offset value $T_{ro}$ such that the temperature of the fuel cell or the cooling medium is gradually decreased or the reference power generation amount is gradually decreased as the speed difference is increased.

In other words, the power generation controller 50 sets the first offset value $T_{ro}$ such that the first offset value is gradually increased as the value of the speed difference is increased when the speed difference is equal to or greater than a predetermined speed difference value.

In other words, as illustrated in FIG. 2, the first offset value $T_{ro}$ is set to 0 when the speed difference is less than or equal to a predetermined speed difference value A. On the other hand, when the speed difference is greater than or equal to the predetermined speed difference value A, the first offset is increased as the value of the speed difference is increased.

The first offset value $T_{ro}$ can be set to a negative value that is less than zero.

Figure 3:
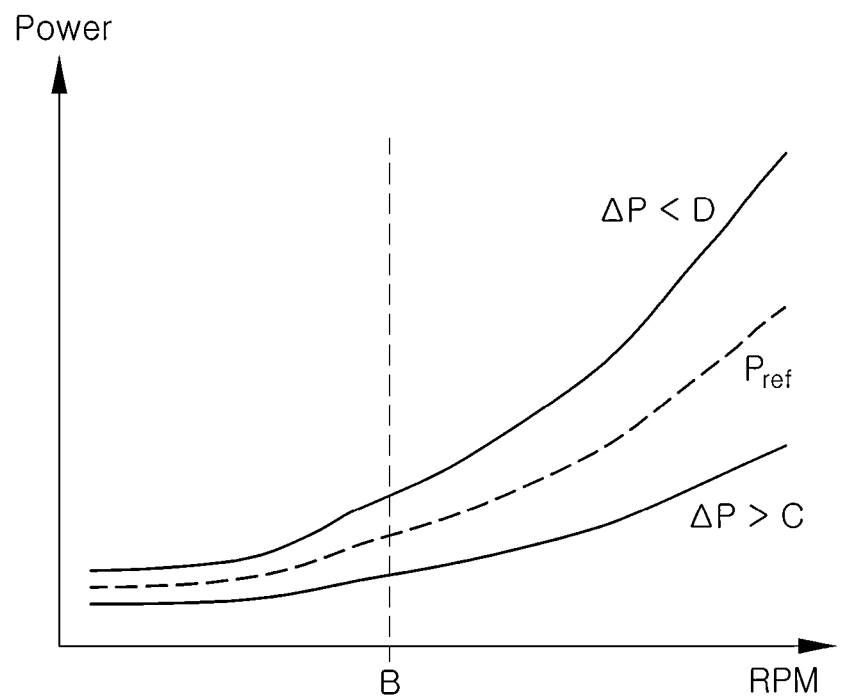
FIG. 3 is a graph of power consumption according to rotation speed of a cooling pump, according to one embodiment of the present disclosure.
Figure 4:
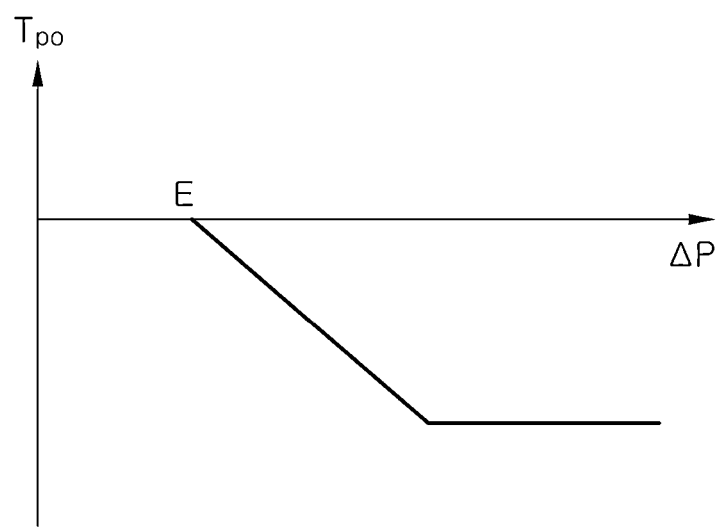
FIG. 4 is a flowchart illustrating a graph illustrating a relationship between a power consumption difference and a second offset value, according to one embodiment of the present disclosure.

FIG. 3 is a graph showing a relationship between the power consumption and the rotation speed of the cooling pump 30. FIG. 4 is a graph illustrating a relationship between a second offset value and a power consumption difference, according to one embodiment of the present disclosure.

Referring to FIGS. 3 and 4, the power generation controller 50 limits the power generation of the fuel cell 10 on the basis of the power consumption difference between actual power consumption of the cooling pump 30 and reference power consumption that is predetermined according to the rotation speed of the cooling pump 30.

Specifically, the power consumption difference $\Delta P$ can be calculated by subtracting the actual power consumption P from the predetermined reference power consumption $P_{rej}$. Here, the reference power consumption is assumed to be the amount of power consumed by the cooling pump 30 when the cooling pump 30 normally operates at a predetermined rotation speed.

$$\Delta P = P_{rej} - P$$

In particular, only when the rotation speed of the cooling pump 30 is higher than a preset rotation speed ($P_{rej} \geq P$, $\Delta P \geq 0$), the power generation controller 50 limits the power generation of the fuel cell 10 on the basis of the power consumption difference $\Delta P$.

More specifically, the power generation controller 50 sets the second offset value $T_{po}$ that is based on the power consumption difference when the power consumption difference $\Delta P$ is greater than C that is greater than zero. The power generation controller 50 also limits the power generation of the fuel cell 10 by applying the second offset value $T_{po}$.

The power generation controller 50 limits the power generation of the fuel cell 10 such that the amount of electric power generated by the fuel cell 10 is equal to or less than a reference power generation amount that is preset according to the temperature of the fuel cell 10 or the cooling medium. The power generation controller applies a second offset value $T_{po}$ that is set on the basis of the power consumption difference to the temperature of the fuel cell 10 or the cooling medium or to the reference power generation amount.

As illustrated in FIG. 4, when the value of the power consumption difference ΔP is equal to or greater than a preset power consumption difference value E, the power generation controller 50 sets the second offset value $T_{po}$ such that the temperature of the fuel cell 10 or the cooling medium that limits the power generation of the fuel cell 10 is gradually reduced or the reference power generation amount is gradually reduced as the power consumption difference ΔP is increased.

Alternatively, when the power consumption difference ΔP is greater than or equal to the preset power consumption difference value E, the power generation controller 50 sets the second offset value $T_{po}$ such that the value of the second offset value $T_{po}$ is increased as the power consumption difference ΔP is increased.

The second offset value $T_{po}$ can be set to a negative value that is less than zero.

Additionally, the power generation controller 50 calculates a final offset value on the basis of the first offset value $T_{ro}$ and the second offset value $T_{po}$ and controls the power generation of the fuel cell 10 on the basis of the calculated final offset value. In one embodiment, the power generation controller 50 calculates the final offset value by applying weights to the first offset value $T_{ro}$ and the second offset value $T_{po}$, respectively.

When the actual power consumption of the cooling pump 30 is greater than a preset reference power consumption ($P_{ref} \geq P$, ΔP≥0), the power generation controller 40 increases the amount of cooling the cooling pump 30 on the basis of the power consumption difference ΔP.

In particular, the cooling controller 40 increases the amount of cooling the cooling pump 30 when the power consumption difference ΔP is smaller than D that is smaller than zero.

Here, the cooling pump 30 may be cooled by circulation of additional cooling liquid or air and the cooling controller 40 may increase the cooling amount for the cooling pump 30 by increasing the rotation speed of an electric cooling pump or an electric radiator fan.

In addition, when each of the first offset value $T_{ro}$ and the second offset value $T_{po}$ is greater than or equal to the preset value, or the sum of the first offset value $T_{ro}$ and the second offset value $T_{po}$ is greater than or equal to the preset value, the case is considered a state in which the cooling cannot be performed due to an excessively large error. In this case, the power generation controller 50 shuts down the fuel cell 10.

Figure 5:
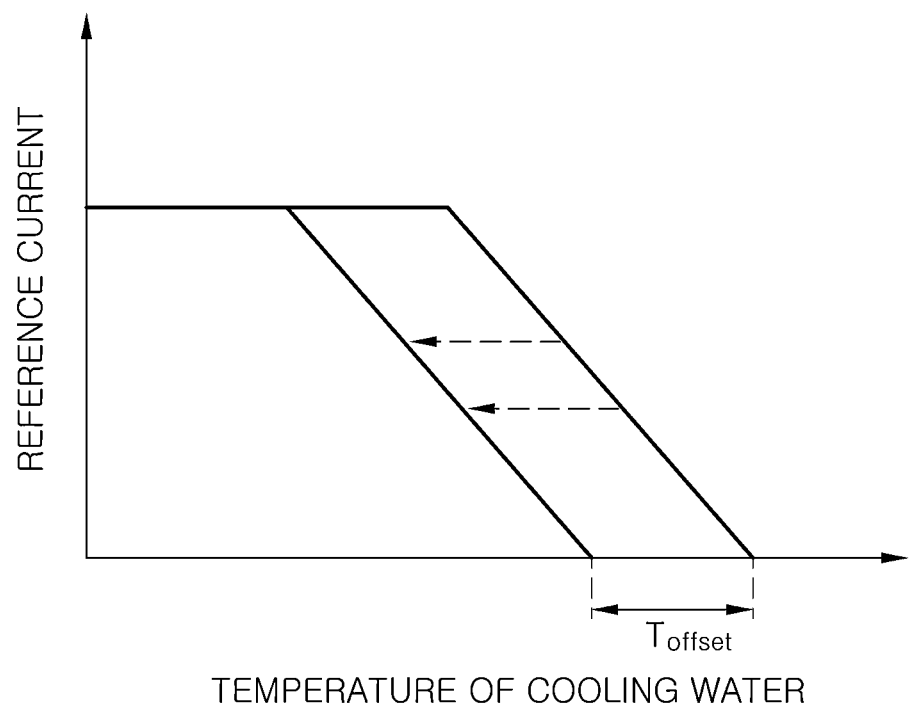
FIG. 5 is a graph of a current limit that varies depending on the temperature of a cooling medium, according to one embodiment of the present disclosure.

FIG. 5 is a graph of a current limit that varies depending on the temperature of a cooling medium, according to one embodiment of the present disclosure.

Referring to FIG. 5, the power generation controller 50 limits the power generation of the fuel cell 10 such that the amount of electric power generated by the fuel cell 10 is equal to or less than a reference current value that varies depending on the temperature of the cooling medium.

Specifically, when the temperature of the cooling medium is lower than or equal to a preset temperature, the reference current value is maintained. On the other hand, when the temperature of the cooling medium is higher than the preset temperature, the reference current value is gradually decreased.

In one embodiment, the power generation controller 50 calculates a temperature offset value that is the sum of the first offset value $T_{ro}$ and the second offset value $T_{po}$ and applies the calculated temperature offset value $T_{offset}$ to the temperature of the fuel cell 10 or the cooling medium or to the reference power generation amount.

More specifically, the power generation controller 50 shifts the reference current value graph that varies depending on the temperature of the cooling medium by the temperature offset value $T_{offset}$. Alternatively, the power generation controller 50 may change the reference current value by applying the temperature offset value $T_{offset}$ to the sensed temperature of the cooling medium or the estimated temperature of the fuel cell 10.

In another embodiment, the power generation controller 50 changes the reference current value by applying a temperature offset value $T_{offset}$ which is the sum of the first offset value $T_{ro}$ and the second offset value $T_{po}$ to the detected temperature of the cooling medium or the estimated temperature of the fuel cell 10.

Figure 6:
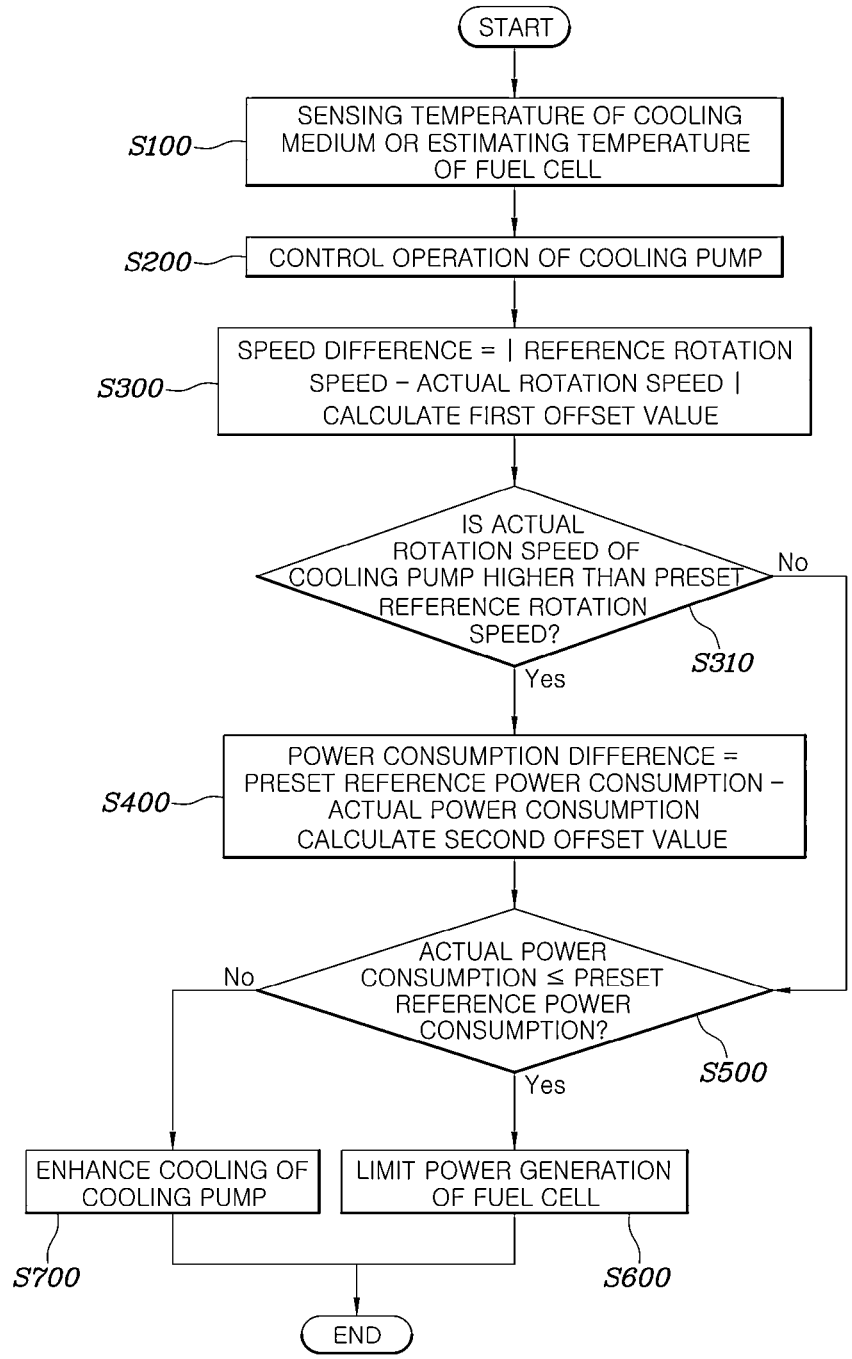
FIG. 6 is a flowchart illustrating an overheating control method for a fuel cell, according to one embodiment of the present disclosure.

FIG. 6 is a flowchart illustrating an overheating control method for a fuel cell, according to one embodiment of the present disclosure.

Referring to FIG. 6, a control method for preventing a fuel cell 10 from overheating, according to one embodiment of the present disclosure, includes: step S100 in which the temperature of the fuel cell 10 is estimated or the temperature of the cooling medium is detected; step S200 in which a cooling pump 30 that circulates a cooling medium through a cooling line 20 connected to the fuel cell 10 is driven on the basis of the estimated temperature of the fuel cell 10 or the detected temperature of the cooling medium; and step S600 in which power generation of the fuel cell 10 is limited on the basis of an operating state of the cooling pump 30.

In step S200 of driving the cooling pump 30, the cooling pump 30 is controlled such that the actual rotation speed of the cooling pump 30 follows a reference rotation speed that is set on the basis of the temperature of the fuel cell 10 or the cooling medium. The method further includes step S300 in which a speed difference between the actual rotation speed of the cooling pump 30 and the reference rotation speed is calculated. In step S600, the amount of power generated by the fuel cell 10 is limited on the basis of the calculated speed difference.

In step S600 of limiting the power generation of the fuel cell 10, the amount of power generated by the fuel cell 10 is limited to be equal to or less than a reference power generation amount that is preset according to the temperature of the fuel cell 10 or the cooling medium. In addition, a first offset value that is set on the basis of the speed difference is applied to the temperature of the fuel cell or the cooling medium or to the reference power generation amount.

The method further includes step S400 in which a power consumption difference is calculated. The power consumption difference is between the actual power consumption of the cooling pump 30 and a reference power consumption that is preset according to the rotation speed of the cooling pump 30. Step S400 is performed prior to step S600. In step S600 of limiting the power generation of the fuel cell 10, the amount of electric power generated by the fuel cell 10 is limited on the basis of the calculated power consumption difference.

The method further includes step S310 in which it is determined whether the rotation speed of the cooling pump 30 is equal to or higher than a preset reference rotation speed ($P_{ref} \geq P$, $\Delta P \geq 0$). Step S310 is performed prior to step S400. Only when the actual rotation speed of the cooling pump 30 is equal to or higher than the preset reference rotation speed, the power generation of the fuel cell 10 is limited on the basis of the power consumption difference $\Delta P$.

In step S600 of limiting the power generation of the fuel cell 10, the amount of electric power generated by the fuel cell 10 is limited to be equal to or less than a reference power generation amount that is preset according to the temperature of the fuel cell 10 or the cooling medium. When the actual power consumption of the cooling pump 30 is equal to or less than the preset reference power consumption (step S500), a second offset value that is set on the basis of the power consumption difference is applied to the temperature of the fuel cell 10 or the cooling medium or to the reference power generation amount.

The method further includes step S700 in which the amount of cooling the cooling pump is increased on the basis of the power consumption difference when the actual power consumption of the cooling pump 30 is greater than the reference power consumption. Step S700 is performed after step S400.

Although only specific embodiments have been described, those having ordinary skill in the art should appreciate that various modifications and changes thereto are possible without departing from the scope and spirit of the present disclosure as claimed.

What is claimed is:

1. A control system for preventing a fuel cell from overheating, the system comprising:
   a fuel cell configured to generate electric power through a reaction of a fuel gas and an oxidation gas;
   a cooling line through a cooling medium flows and in which the cooling medium performs heat exchange with the fuel cell;
   a cooling pump installed on the cooling line and configured to circulate the cooling medium through the cooling line when the cooling pump is driven;
   a cooling controller configured to control an operating state of the cooling pump on the basis of a temperature of the fuel cell or a temperature of the cooling medium; and
   a power generation controller configured to limit power generation of the fuel cell according to the operating state of the cooling pump,
   wherein the cooling controller controls the cooling pump such that an actual rotation speed of the cooling pump follows a reference rotation speed that is set on the basis of the temperature of the cooling medium or the fuel cell,
   wherein a speed difference between the reference rotation speed and the actual rotation speed is calculated before the power generation controller limits the power generation of the fuel cell,
   wherein the power generation controller limits the power generation of the fuel cell on the basis of the calculated speed difference between the actual rotation speed of the cooling pump and the reference rotation speed,
   wherein the power generation controller limits the power generation of the fuel cell such that an amount of electric power generated by the fuel cell is equal to or less than a reference power generation amount that is set according to the temperature of the fuel cell or the cooling medium, and
   wherein the power generation controller applies a first offset value that is set on the basis of the speed difference to the temperature of the fuel cell or the cooling medium or to the reference power generation amount.

2. The system according to claim 1, wherein the cooling line is provided with a radiator that allows the cooling medium flowing along the cooling line to perform heat exchange with external air,
   the cooling line is connected such that an inlet and an outlet of the fuel cell communicate with the radiator, and
   the cooling pump causes the cooling medium discharged from the outlet of the fuel cell to partially or entirely flow to the radiator or causes the cooling medium discharged from the radiator to flow into the inlet of the fuel cell.

3. The system according to claim 1, further comprising a temperature sensor configured to sense the temperature of the cooling medium flowing through the cooling line, installed on the cooling line, and positioned near the outlet of the fuel cell,
   wherein the cooling controller controls the operating state of the cooling pump on the basis of the temperature of the cooling medium, which is sensed by the temperature sensor.

4. The system according to claim 1, wherein, when the speed difference has a value that is equal to or greater than a predetermined speed difference value, the power generation controller sets the first offset value such that the temperature of the fuel cell or the cooling medium, which gradually limits the power generation of the fuel cell, is gradually reduced or the reference power generation amount is gradually reduced as the speed difference is increased.

5. The system according to claim 1, wherein the power generation controller limits the power generation of the fuel cell on the basis of a power consumption difference between a reference power consumption value that is preset according to the rotation speed of the cooling pump and an actual power consumption value of the cooling pump.

6. The system according to claim 5, wherein the power generation controller limits the power generation of the fuel cell on the basis of the power consumption difference only when the actual rotation speed of the cooling pump is equal to or higher than the preset reference rotation speed.

7. The system according to claim 5, wherein the power generation controller limits the power generation of the fuel cell such that the amount of electric power generated by the fuel cell is equal to or less than a preset reference power generation amount that is preset according to the temperature of the fuel cell or the cooling medium, and
   wherein the power generation controller applies a second offset value that is set on the basis of the power consumption difference to the temperature of the fuel cell or the cooling medium or to the reference power generation amount when the actual power consumption of the cooling pump is equal to or less than the reference power consumption.

8. The system according to claim 7, wherein, when the power consumption difference has a value that is equal to or greater than a predetermined power consumption difference value, the power generation controller sets the second offset value such that the temperature of the fuel cell or the cooling medium, which limits the power generation of the fuel cell, is gradually reduced or the reference power generation amount is gradually reduced as the power consumption difference is increased.

9. The system according to claim 5, wherein the cooling controller increases an amount of cooling the cooling pump on the basis of the power consumption difference when the actual power consumption of the cooling pump is higher than the reference power consumption.

10. A control method for preventing a fuel cell from overheating, the method comprising:
- estimating a temperature of a fuel cell or sensing a temperature of a cooling medium;
- controlling an operating state of a cooling pump that circulates the cooling medium through a cooling line connected to the fuel cell on the basis of the estimated temperature of the fuel cell or the sensed temperature of the cooling medium; and
- limiting power generation of the fuel cell on the basis of the operating state of the cooling pump,
- wherein, in the controlling of the operating state of the cooling pump, the cooling pump is controlled such that an actual rotation speed of the cooling pump follows a reference rotation speed that is set on the basis of the temperature of the cooling medium or the fuel cell,
- wherein the method further comprises calculating a speed difference between the reference rotation speed and the actual rotation speed, the calculating being performed prior to the limiting of the power generation of the fuel cell,
- wherein the limiting of the power generation of the fuel cell is performed to limit an amount of electric power generated by the fuel cell on the basis of the calculated speed difference, and
- wherein the limiting of the power generation of the fuel cell is performed such that the amount of electric power generated by the fuel cell is equal to or less than a preset reference power generation amount according to the temperature of the fuel cell or the cooling medium and such that a first offset value that is set on the basis of the speed difference is applied to the temperature of the fuel cell or the cooling medium or to the reference power generation amount.

11. The method according to claim 10, further comprising calculating a power consumption difference between an actual power consumption of the cooling pump and a reference power consumption that is set according to the rotation speed of the cooling pump,
- wherein the calculating is performed prior to the limiting of the power generation, and
- wherein the limiting of the power generation is performed to limit the amount of electric power generated by the fuel cell on the basis of the calculated power consumption difference.

12. The method according to claim 11, wherein the limiting of the power generation is performed such that the amount of electric power generated by the fuel cell is limited to be equal to or less than a predetermined reference power generation amount that is preset according to the temperature of the fuel cell or the cooling medium and such that a second offset value that is set on the basis of the power consumption difference is applied to the temperature of the fuel cell or the cooling medium or to the reference power generation amount when the actual power consumption of the cooling power is equal to or lower than the reference power consumption.

13. The method according to claim 11, further comprising increasing an amount of cooling the cooling pump on the basis of the power consumption difference when the actual power consumption of the cooling pump is higher than the reference power consumption, wherein the increasing of the cooling amount is performed after the calculating of the power consumption difference.

* * * * *